US008872961B2

(12) United States Patent
Kimura et al.

(10) Patent No.: US 8,872,961 B2
(45) Date of Patent: Oct. 28, 2014

(54) FOCUSING IMAGE VERIFYING DEVICE

(75) Inventors: Yoshitaka Kimura, Tokyo (JP); Hiroyuki Tanaka, Tokyo (JP)

(73) Assignee: Pentax Ricoh Imaging Company, Ltd., Tokyo (JP)

( * ) Notice: Subject to any disclaimer, the term of this patent is extended or adjusted under 35 U.S.C. 154(b) by 183 days.

(21) Appl. No.: 13/156,611

(22) Filed: Jun. 9, 2011

(65) Prior Publication Data

US 2012/0044405 A1 Feb. 23, 2012

(30) Foreign Application Priority Data

Aug. 19, 2010 (JP) ................................. 2010-184386

(51) Int. Cl.
*H04N 5/232* (2006.01)
*H04N 5/235* (2006.01)

(52) U.S. Cl.
CPC ................................. *H04N 5/23212* (2013.01)
USPC ............................ 348/346; 348/345; 348/362

(58) Field of Classification Search
CPC .......... H04N 5/23212; H04N 5/23293; H04N 5/235; G03B 13/32
USPC .............. 348/222.1, 345, 346, 347, 348, 349, 348/350, 351, 352, 353, 354, 355, 356, 357, 348/362
See application file for complete search history.

(56) References Cited

U.S. PATENT DOCUMENTS

| | | | |
|---|---|---|---|
| 7,145,602 B2 * | 12/2006 | Shiga | 348/362 |
| 7,184,090 B2 | 2/2007 | Watanabe et al. | |
| 7,414,648 B2 * | 8/2008 | Imada | 348/208.12 |
| 2001/0035910 A1 * | 11/2001 | Yukawa et al. | 348/349 |
| 2011/0008031 A1 * | 1/2011 | Kusaka | 396/100 |

FOREIGN PATENT DOCUMENTS

| | | |
|---|---|---|
| JP | 10-197337 | 7/1998 |
| JP | 2003-107327 | 4/2003 |
| JP | 2003-279838 | 10/2003 |
| JP | 2004-242010 | 8/2004 |
| JP | 2007-027969 | 2/2007 |

OTHER PUBLICATIONS

Japanese Office Action dated Mar. 14, 2014.
Japan Office action, mail date is Aug. 12, 2014.

* cited by examiner

*Primary Examiner* — Twyler Haskins
*Assistant Examiner* — Peter Chon
(74) *Attorney, Agent, or Firm* — Greenblum & Bernstein, P.L.C.

(57) ABSTRACT

An autofocus system is provided that includes a focus-verification image-recapturing processor and a focus-verification image display processor. The focus-verification image-recapturing processor sets ISO sensitivity to a value lower than a predetermined value and increases an exposure value by adjusting at least one of an aperture value and an exposure time to carry out a focus-verification image-recapturing operation under focusing conditions applied in an antecedent autofocus operation when ISO sensitivity that is set in said auto focus operation exceeds the predetermined value. The focus-verification image display processor displays a focus-verification image obtained by the focus-verification image-recapturing operation when the ISO sensitivity that is set in the auto focus operation exceeds the predetermined value.

11 Claims, 6 Drawing Sheets

HIGH SENSITIVITY : HIGH NOISE

LOW SENSITIVITY : LOW NOISE

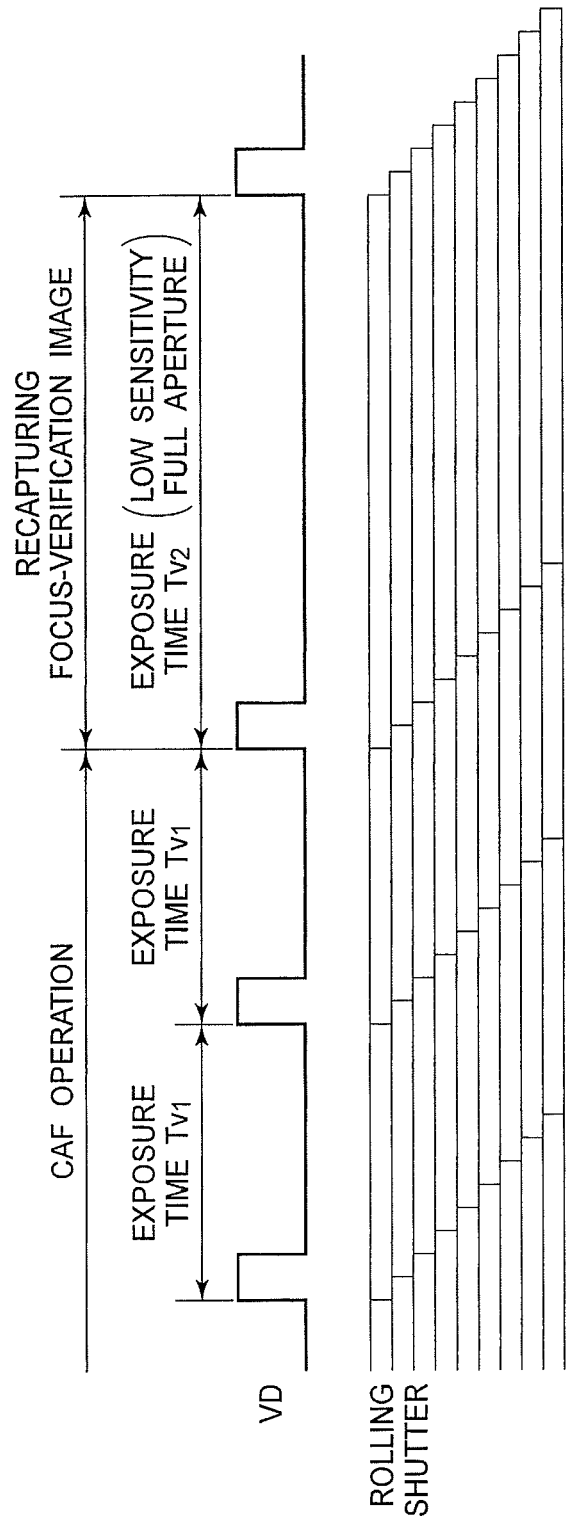

FOCUSING IMAGE VERIFYING DEVICE

BACKGROUND OF THE INVENTION

1. Field of the Invention

The present invention relates to a device that displays a focusing image for verification during an autofocus operation performed by a digital camera.

2. Description of the Related Art

A contrast-detect autofocus (AF) function has been employed by various types of digital cameras where, in general, a focusing image is temporarily displayed on a monitor of the camera for a photographer to check whether or not the image is adequately in focus. However, the size of the monitor provided on the camera is usually not sufficient for a photographer to verify the quality or conditions of the focusing image when the entire image is displayed on the display. In order to overcome such problems, a camera disclosed in KOKAI 2004-242010 enlarges an area with the highest degree of focusing and further indicates a subarea within the enlarged image having the highest focusing degree by framing the subarea.

SUMMARY OF THE INVENTION

However, when the focusing image is dark, visibility of the focusing image is not sufficient even though a part of the focusing image is enlarged and displayed on the monitor. On the other hand, when ISO sensitivity is increased to make the image brighter, noise also increases and thus visibility deteriorates.

Accordingly one aspect of the present invention is to provide a system that enables a focusing image with high visibility to always be displayed on the monitor of a digital camera.

According to the present invention, an autofocus system or a camera that includes a focus-verification image-recapturing processor and a focus-verification image-display processor is provided. The focus-verification image-recapturing processor sets ISO sensitivity to a value lower than a predetermined value and increases the exposure value by adjusting at least one of an aperture value and an exposure time to carry out a focus-verification image-recapturing operation under focusing conditions established in an earlier autofocus operation when ISO sensitivity, which is set in said auto focus operation, is higher than the predetermined value. The focus-verification image display processor displays a focus-verification image obtained by the focus-verification image-recapturing operation when the ISO sensitivity that is set in the autofocus operation is higher than the predetermined value.

BRIEF DESCRIPTION OF THE DRAWINGS

The objects and advantages of the present invention will be better understood from the following description, with reference to the accompanying drawings in which:

FIG. 6 is a timing chart illustrating the relationship between vertical sync signals VD and rolling shutter during the CAF operation and the focus-verification image-recapturing operation.

DESCRIPTION OF THE PREFERRED EMBODIMENTS

Figure 1:
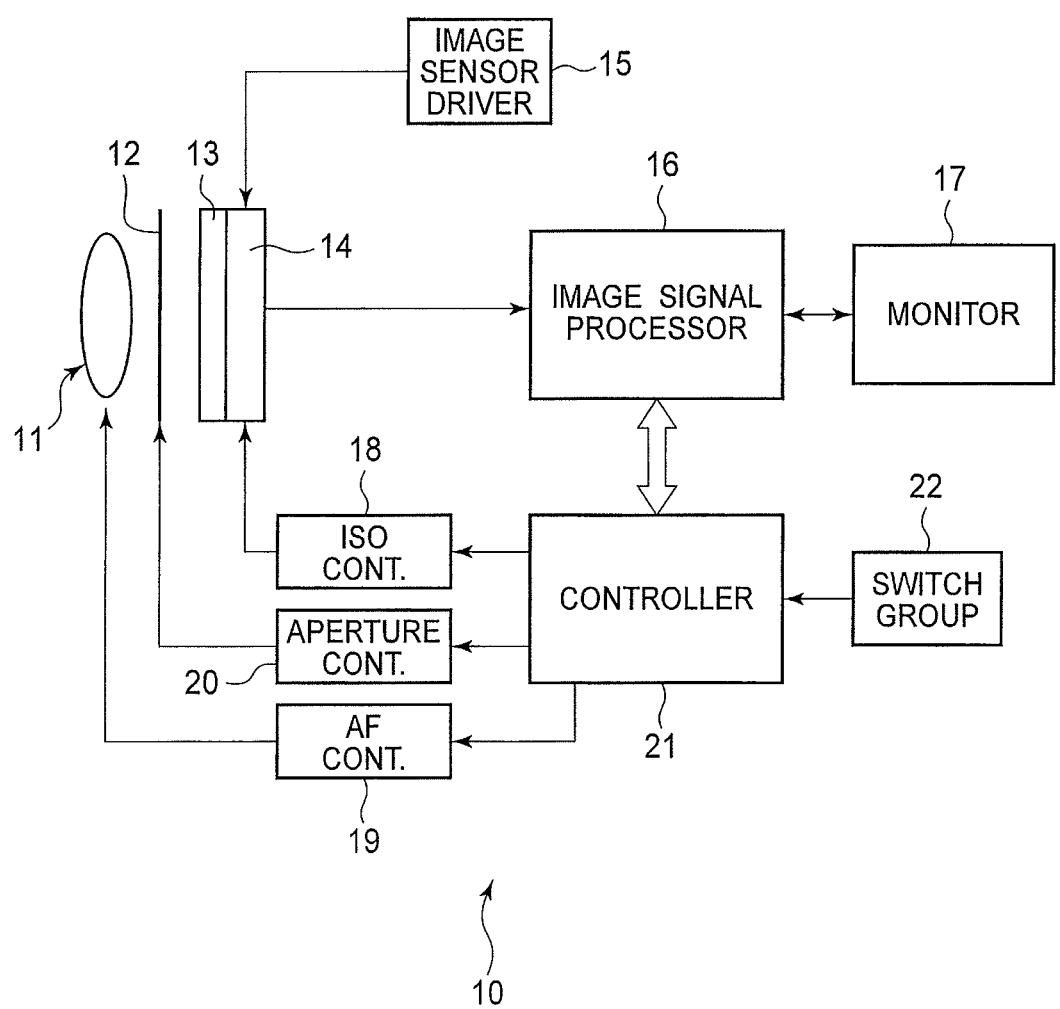
FIG. 1 is a block diagram schematically illustrating the general structure of a digital camera to which an autofocusing operation of an embodiment of the present invention is applied.

The present invention is described below with reference to the embodiments shown in the drawings.

FIG. 1 is a block diagram schematically illustrating the general structure of a digital camera to which an autofocusing operation of an embodiment of the present invention is applied.

The digital camera 10 may be a digital single-lens reflex camera, but it is not limited to this type. Light made incident to a lens system 11 forms an image on an imaging surface of an image sensor 14, for example, through an aperture 12 and a color filter array 13. The image sensor 14 may be controlled by drive signals from an image sensor driver 15. Image signals obtained by the image sensor 14 may be fed to an image signal processor 16 to be subjected to various types of image signal processing that are well known in the art, and in turn, the image may be displayed on a monitor 17. At this time, an ISO controller 18 may control the output gain (ISO sensitivity) of the image signals from the image sensor 14.

An AF controller 19 may control the positions of the lenses in the lens system 11 to carry out the autofocus process. Further, an aperture controller 20 may control the size of the aperture 12. Note that the ISO controller 18, the AF controller 19, and the aperture controller 20 are controlled by instructions from a controller 21, and the controller 21 may perform various types of processes based on the manipulation of switches in a switch group 22. The switch group 22 may include a release switch, an AF button, dial switches, a touch panel, etc.

Figure 2:
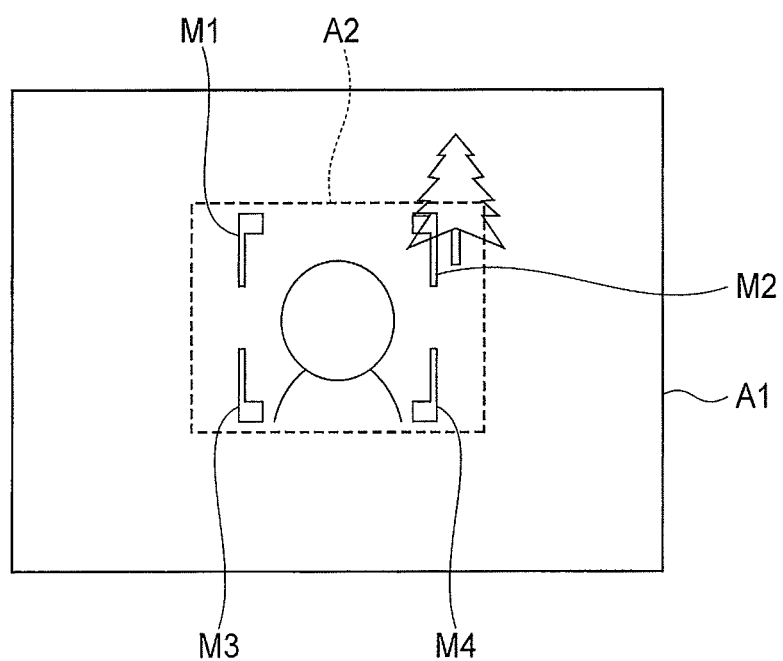
FIG. 2 is an example of a live view image displayed on the monitor before the contrast-detect autofocusing operation (CAF operation) is carried out.
Figure 3:
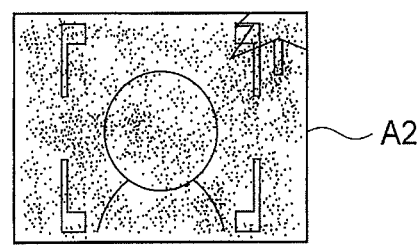
FIG. 3 is a schematic of an enlarged focus-verification image captured at high ISO sensitivity.

In the present embodiment, a contrast-detect method is applied in the autofocus operation. With reference to FIGS. 1 to 3, an outline of the autofocus operation and focusing image verification operation of the present embodiment are explained.

FIG. 2 is an example of a live view image displayed on the monitor 17 before the contrast-detect autofocusing operation (CAF operation) is carried out. Pixel signals within an actual pixel area (or an effective pixel area) A1 may be read from the image sensor 14. Four brackets M1-M4 are marks for indicating an AF point. In the present embodiment, area A2 is the part of area A1 that is used as the autofocus area and it includes the center area surrounded by the brackets M1-M4. The autofocus operation is carried out with reference to the contrast between images within the partial area A2.

Namely, in the CAF operation of the present embodiment the area A2, which is a portion of the actual pixel area (or the effective pixel area) that is normally sourced for image data, is preset as the focus area and a high frame-rate mode is activated so that the image sensor 14 is driven at a high frame-rate to capture data from the focus area A2. And in the CAF operation of the present embodiment, only the pixel signals within the focus area A2 may be captured repeatedly to carry out the autofocus operation, which uses contrast-detection in association with an operation of the lens system 11 that uses the AF controller 19. Further, in the present embodiment, a focusing still image (may be an in-focus image) of the area A2 may be enlarged and displayed on the monitor 17 for a predetermined time (e.g., about 2 seconds) as a focus-verification image when the CAF operation finishes.

However, in the CAF operation of the present embodiment, high ISO sensitivity (gain) is required to display a bright focus-verification image when a dark object is photographed. Moreover, determination of the focus quality may be difficult when an enlarged image of the area A2 is output to the monitor under a gain corresponding to high ISO sensitivity, because high ISO sensitivity also increases the noise level, as illustrated in FIG. 3.

Therefore, in the present embodiment, the image of the object is recaptured under the same focusing conditions with relatively low ISO sensitivity when the image-capturing and autofocusing procedures of the CAF operation are performed with ISO sensitivity higher than the predetermined sensitivity. At the same time, the controller 21 instructs the AF controller 19 and the aperture controller 20 to adjust an exposure time and/or aperture value (f number) to achieve an appropriate exposure value that compensates for reduced ISO sensitivity from the ISO controller 18.

Figure 4:
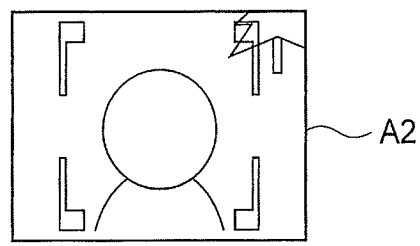
FIG. 4 is a schematic of an enlarged focus-verification image captured by a focus-verification image-recapturing operation of the present embodiment at low ISO sensitivity.

As illustrated in FIG. 4, a focusing image of the focusing area A2 captured at low ISO sensitivity is enlarged and displayed on the monitor 17. Thereby, the focusing image with reduced noise and high S/N ratio is displayed on the monitor 17 for a photographer to verify the focusing quality.

Figure 5:
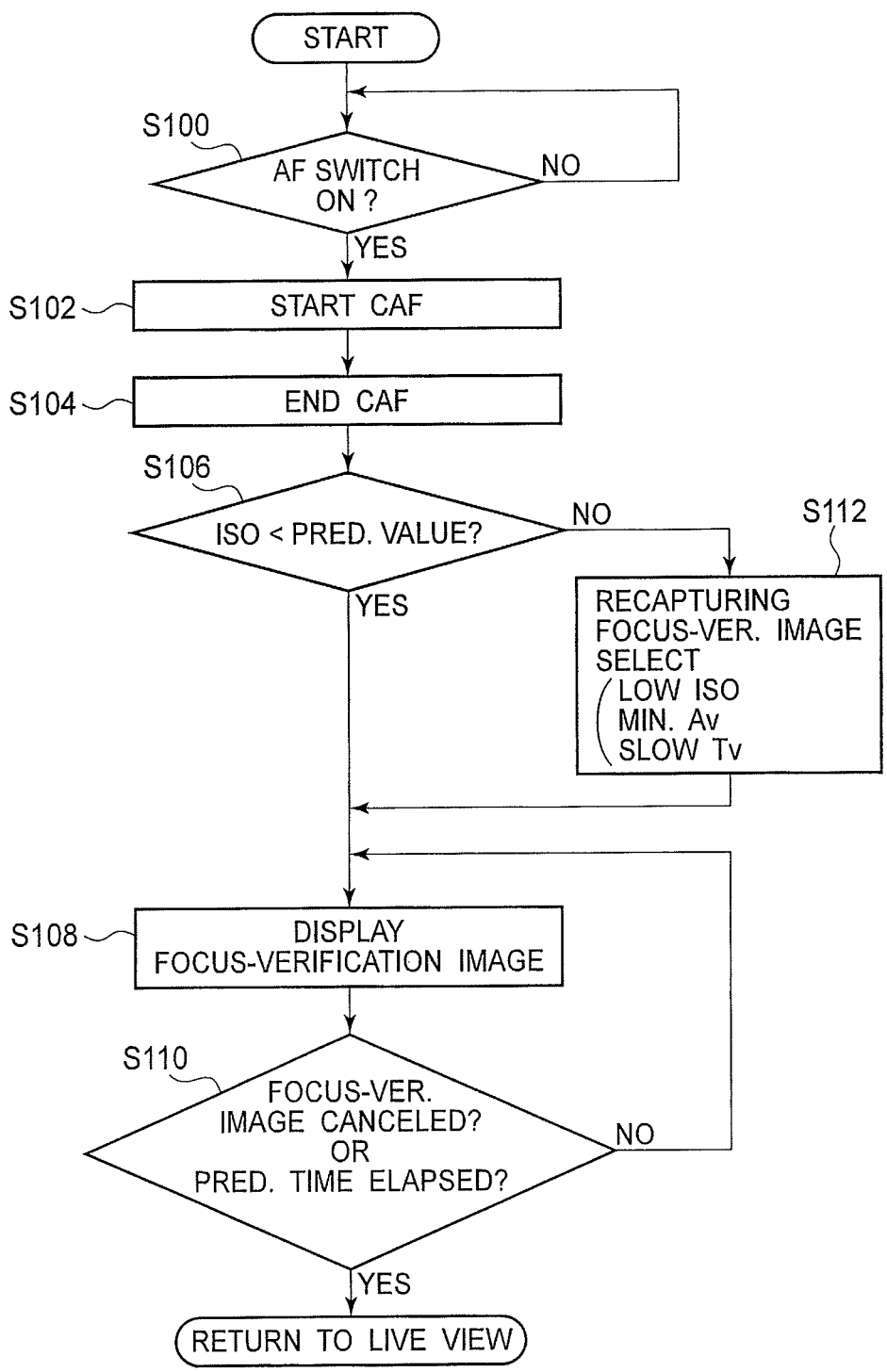
FIG. 5 is a flowchart illustrating an autofocus operation and a focusing image verification operation carried out in the present embodiment.

With reference to FIGS. 1, 2, and 5, the autofocus operation and the focusing image verification operation of the present embodiment will be explained.

While live view is displayed on the monitor 17, the controller 21 may execute the procedures illustrated in the flowchart of FIG. 5 in parallel with the live view operation. In Step S100, whether or not the autofocus (AF) switch (not shown) of the switch group 22 has been activated is determined, and this determination is repeated until the AF switch is turned on.

Once it is determined in Step S100 that the AF switch (not shown) is in the ON position, the CAF operation starts at Step S102. In the CAF operation, the ISO sensitivity is set based on a photometric value, and in turn pixel signals of focusing area A2 of FIG. 2 are sequentially read from the image sensor 14. Further, the AF operation that refers to the contrast of the sequentially output images of the focusing area A2 is carried out.

When the CAF operation finishes at Step S104, the focus conditions of the lens system 11 are retained and the last focusing image obtained within the focusing area A2 in the CAF operation is stored in an image memory as a focus-verification image. At Step S106, it is determined whether or not the ISO sensitivity (gain) that is set during the autofocus operation is lower than a predetermined value. When the ISO sensitivity is lower than the predetermined value, such that when it is determined that the ISO sensitivity is sufficiently low, the focus-verification image (the image within area A2), which is stored in the image memory, is enlarged and displayed on the monitor 17 at Step S108.

On the other hand, when it is determined that the ISO sensitivity is higher than the predetermined value at Step S106, such that when it is determined that the ISO sensitivity is too high from the aspect of an acceptable noise level, the ISO sensitivity is reset to a low value (a value lower than the above predetermined value) at Step S112. Further, the aperture value Av and the shutter speed Tv are adjusted under the retained focus conditions of the CAF operation and a focus-verification image corresponding to area A2 is captured under the appropriate exposure value Ev. Subsequently, the focus-verification image stored at Step S104 in the image memory is replaced by the new focus-verification image, which is captured at Step S112.

Note that if the aperture value Av corresponds to the full aperture when recapturing the new focus-verification image, a shallow focus is obtained, which allows for easy verification and enables a high shutter speed Tv. However, the aperture value Av is not restricted to only the full aperture and may be set to any value. Further, it may be configured so that a user sets the aperture value Av. When the recapturing process for the focus-verification image is completed in Step S112, the focus-verification image corresponding to the focus area A2 is enlarged and displayed on the monitor 17.

In Step S110, it is determined whether the focus-verification image displayed on the monitor 17 has been canceled or whether it has been displayed for a predetermined time. The cancellation of the focus-verification image display may be carried out by operating a predetermined button (not shown) of the switch group 22, and the predetermined time may be set at about two seconds. When it is determined that either cancellation of the focus-verification image or its display for the predetermined time has taken place, the focusing image verification process in the CAF operation is terminated, and in turn, the normal live view image is displayed on the monitor 17 and the camera stands by in readiness for shooting. On the other hand, when neither cancellation of the focus-verification image nor its display in excess of the predetermined time has been detected, the focusing image verification operation returns to Step S108 and the enlarged display of the focus-verification image continues.

With reference to the timing chart of FIG. 6, the difference between the image-capturing operations in the CAF operation and the focus-verification image-recapturing operation is explained. FIG. 6 is a timing chart illustrating the relationship between vertical sync signals VD and a rolling shutter during the CAF operation and the focus-verification image-recapturing operation.

Since the image sensor 14 is driven at a high frame-rate mode during the CAF operation, the period of the vertical sync signals VD is decreased and the available maximum exposure time is therefore shortened. In FIG. 6, the exposure time $Tv_1$ for the CAF operation is set to the maximum value, which corresponds to the period of the vertical sync signals VD in the CAF operation.

On the other hand, in the focus-verification image-recapturing operation of Step S112 (FIG. 5), a relatively low ISO sensitivity is set and a relatively small aperture value (smaller f number or larger lens opening) Av and/or a relatively slow shutter speed (longer exposure time) $Tv_2$ are selected compared to those in the CAF operation. In FIG. 6, the shutter speed $Tv_2$ (exposure time) of the recapturing operation is approximately doubled with respect to $Tv_1$ while the aperture value Av is set to the minimum or full aperture. Note that in the example illustrated in FIG. 6, an extended period of the vertical sync signal VD is required in order to slow down the shutter speed $Tv_2$ or extend the exposure time. Therefore, in FIG. 6, the period of the vertical sync signals VD is also doubled from that of the CAF operation, and the frame rate is replaced.

As described above, according to the present embodiment, a focus-verification image of high visibility is always available on the monitor of the digital camera. Namely, in the present embodiment, an image used in focusing verification is recaptured under low ISO sensitivity when the CAF operation is carried out under high ISO sensitivity to capture the image of a dark object. Thereby, a focus-verification image with less noise can be displayed on the monitor and the visibility of the focus-verification image on the monitor is improved. This is especially advantageous when employing a high frame rate to reduce the time of the CAF operation. Further, in the present embodiment, since an enlarged focus-verification image is displayed on the monitor, verification of the focusing image can be more easily facilitated.

Although the embodiment of the present invention has been described herein with reference to the accompanying drawings, obviously many modifications and changes may be made by those skilled in this art without departing from the scope of the invention.

The present disclosure relates to subject matter contained in Japanese Patent Application No. 2010-184386 (filed on Aug. 19, 2010), which is expressly incorporated herein, by reference, in its entirety.

The invention claimed is:

1. An autofocus system, comprising:
a focus-verification image-recapturing processor that sets an ISO sensitivity to a value lower than a predetermined value and increases an exposure value by adjusting at least one of an aperture value and an exposure time to carry out a focus-verification still image-recapturing operation when, under the same focusing conditions, the ISO sensitivity set in an antecedent autofocus operation is higher than said predetermined value; and
a focus-verification image display processor that displays a focus-verification still image obtained by said focus-verification image-recapturing operation when said ISO sensitivity set in said antecedent autofocus operation is higher than said predetermined value, and displays a focusing verification image captured in said antecedent autofocus operation for focus verification when said ISO sensitivity during said antecedent autofocus operation is less than said predetermined value.

2. The autofocus system as in claim 1, wherein an image-capturing operation carried out by said focus-verification image-recapturing processor is performed under a frame-rate that is slower than that in said autofocus operation.

3. The autofocus system as in claim 2, wherein said autofocus operation is carried out using only part of an effective pixel area of an image sensor.

4. The auto focus system as in claim 1, wherein said aperture value is set to a smaller aperture value in said focus-verification image-recapturing operation.

5. A digital camera, comprising:
a focus-verification image-recapturing processor that sets an ISO sensitivity to a value lower than a predetermined value and increases an exposure value by adjusting at least one of an aperture value and an exposure time to carry out a focus-verification still image-recapturing operation when, under the same focusing conditions, the ISO sensitivity set in an antecedent autofocus operation is higher than said predetermined value; and
a focus-verification image display processor that displays a focus-verification still image obtained by said focus-verification image-recapturing operation when said ISO sensitivity set in said antecedent autofocus operation is higher than said predetermined value, and displays a focusing verification image captured in said antecedent autofocus operation for focus verification when said ISO sensitivity during said antecedent autofocus operation is less than said predetermined value.

6. The digital camera as in claim 5, wherein an image-capturing operation carried out by said focus-verification image-recapturing processor is performed under a frame-rate that is slower than that in said autofocus operation.

7. The digital camera as in claim 6, wherein said autofocus operation is carried out using only part of an effective pixel area of an image sensor.

8. The digital camera as in claim 5, wherein said aperture value is set to a smaller aperture value in said focus-verification image-recapturing operation.

9. The digital camera as in claim 5, wherein a live view image is displayed when the display of said focus-verification image is terminated.

10. The digital camera as in claim 5, wherein said camera stands in readiness by for shooting when the display of said focus-verification image is terminated.

11. An autofocus method in a digital camera, comprising:
setting, using a focus-verification image-recapturing processor, an ISO sensitivity to a value lower than a predetermined value and increasing an exposure value by adjusting at least one of an aperture value and an exposure time to carry out a focus-verification still image-recapturing operation when, under the same focusing conditions, the ISO sensitivity is set in an antecedent autofocus operation is higher than said predetermined value;
displaying, using a focus-verification image display processor, a focus-verification still image obtained by said focus-verification image-recapturing operation when said ISO sensitivity set in said antecedent autofocus operation is higher than said predetermined value; and
displaying, for focus verification, a focusing verification image captured in said antecedent autofocus operation when said ISO sensitivity during said antecedent autofocus operation is less than said predetermined value.

* * * * *